United States Patent [19]

Elman

[11] Patent Number: 4,799,408

[45] Date of Patent: Jan. 24, 1989

[54] AUTOMATIC CUTTING BIT RECOVERY

[75] Inventor: Larisa A. Elman, Marblehead, Mass.

[73] Assignee: General Electric Company, Cincinnati, Ohio

[21] Appl. No.: 896,586

[22] Filed: Aug. 18, 1986

Related U.S. Application Data

[63] Continuation of Ser. No. 703,954, Feb. 21, 1985, abandoned.

[51] Int. Cl.⁴ ............................................. B23B 3/00
[52] U.S. Cl. ...................................... 82/1 C; 82/2 B; 364/474.01
[58] Field of Search ................... 82/1 C, 2 B; 408/6, 408/11; 364/474

[56] References Cited

U.S. PATENT DOCUMENTS

| | | | |
|---|---|---|---|
| 4,442,493 | 4/1984 | Wakai et al. | 82/2 B |
| 4,489,377 | 12/1984 | Mawyer | 364/474 |
| 4,513,366 | 4/1985 | Munekata et al. | 82/2 B |
| 4,604,705 | 8/1986 | Imanishi | 364/474 |

FOREIGN PATENT DOCUMENTS 206301  12/1983  Japan ..................................... 82/2 B Primary Examiner—James G. Smith
Assistant Examiner—Blynn Shideler
Attorney, Agent, or Firm—Derek P. Lawrence; Nathan D. Herkamp

[57] ABSTRACT

In the present invention, the breakage of a cutting tool is sensed during a cutting operation of stock on a lathe. A boundary is defined around the stock. The cutting tool is withdrawn stepwise along the same path taken up to the point of breakage. After each step, inquiry is made as to whether the tool has crossed the boundary. When it does, the tool is brought directly to a tool changing station without further stepwise withdrawal.

10 Claims, 2 Drawing Sheets

AUTOMATIC CUTTING BIT RECOVERY

This application is a continuation of application Ser. No. 703,954, filed Feb. 21, 1985, now abandoned.

The present invention relates to the automatic replacement of cutting bits in machine tools such as latches, drilling machines, boring machines and milling machines.

BACKGROUND OF THE INVENTION

When a cutting bit breaks, during a cutting operation, an operator must manually remove the cutting bit and replace it. This requires that an operator be available at the machine tool, and risks damage to the workpiece and machine tool because of error by the operator in choosing a suitable path along which to move the bit away from the workpiece so it can be replaced.

OBJECTS OF THE INVENTION

It is an object of the invention to provide a new and improved procedure for automatically replacing machine tool cutting bits.

SUMMARY OF THE INVENTION

In one form of the present invention, the breakage of a cutting tool is sensed during a cutting operation of stock on a lathe. A boundary is defined around the stock. The cutting tool is withdrawn stepwise along the same path taken up to the point of breakage. After each step, inquiry is made as to whether the tool has crossed the boundary. When it does, the tool is brought directly to a tool changing station without further stepwise withdrawal.

DETAILED DESCRIPTION OF THE INVENTION

Figure 1:
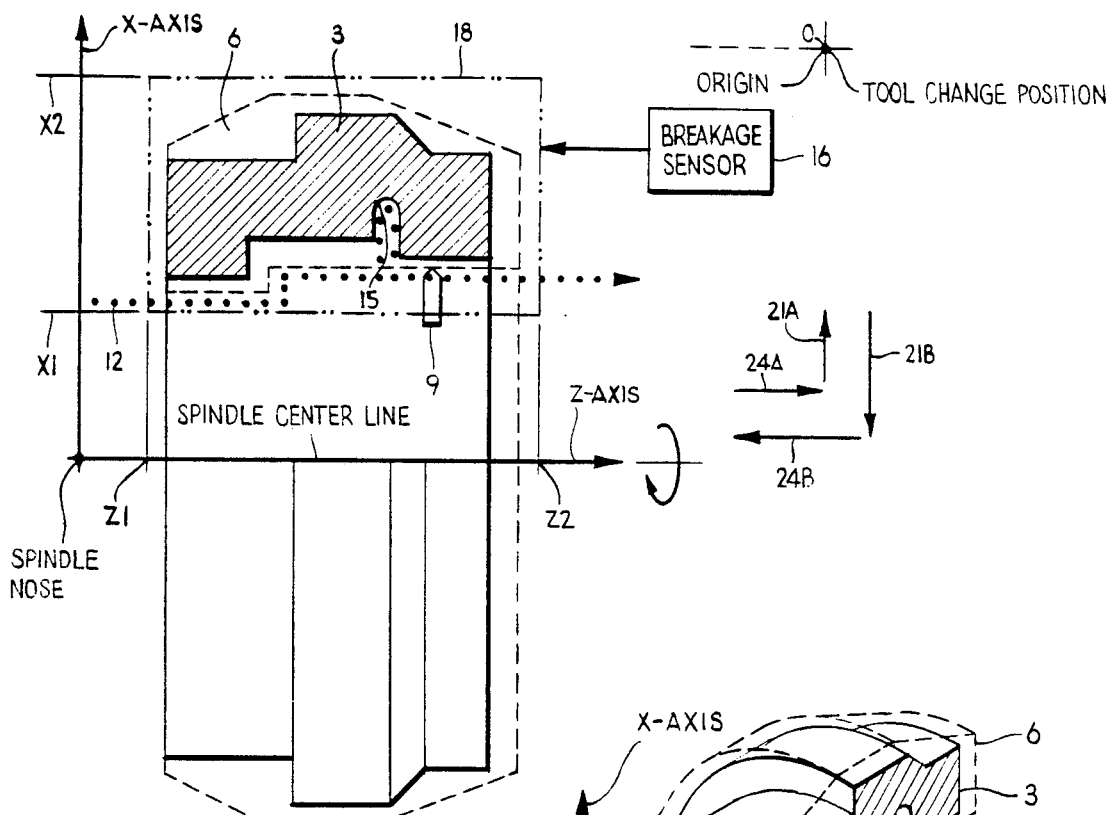
FIG. 1 illustrates stock being cut in a lathe.
Figure 2:
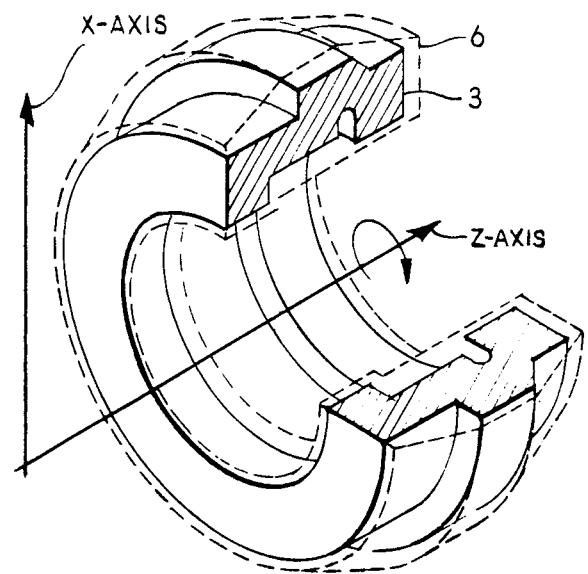
FIG. 2 illustrates the stock of FIG. 1 in perspective.
Figure 3:
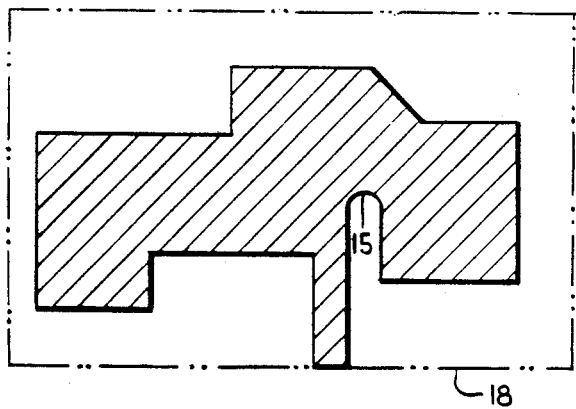
FIG. 3 illustrates a boundary (i.e., a "safe zone") defined around the stock of FIG. 1.

FIG. 1 illustrates in cross section a workpiece 3 to be cut from stock 6 in a lathe (not shown). The workpiece 3 and stock 6 are illustrated in perspective view in FIG. 2. The lathe rotates the workpiece about the spindle centerline (z-axis). The cutting is done by a cutting bit 9 which is moved by a tool holder (also not shown), as is well known in the machine tool art. As FIG. 1 shows, the cutting bit follows dotted path 12 in cutting inner portion of the workpiece 3. If the cutting bit 9 should break when it is positioned at point 15, and if the breakage is detected by breakage sensor 16, the present invention operates as follows. A safe zone 18, shown in FIG. 3, is called into use by the Machine Control Logic (MCL) which is available with General Electric Mark Century 2000 Numerical controls (NC). The safe zone is defined in the part program and represents the minimum cylindrical region which will completely contain the workpiece profile including all of its stock. It can be easily defined again in the part program if desired, after any amount of stock has been removed. The MCL checks the position of the broken bit 9 against the safe zone boundaries, and safely retracts it out of the workpiece to the tool change position, in an automatic manner. The safe zone 18 defines a radial outer boundary X2 and radial inner boundary X1 (X1 and X2 are radial with respect to the workpiece on lathe spindle centerline), and also defines an axial leftmost boundary Z1 and axial rightmost boundary Z2.

The MCL allows axial motion of the bit 9 only when it is radially outside boundary X2 or radially inside boundary X1, and axially inside (i.e., to the left) boundary Z1 and axially outside (to the right) boundary Z2. Thus, a collision with the workpiece is prevented by these restrictions.

The MCL allows the bit 9 to move within the safe zone boundaries under control of the NC program, unless and until the break sensor 16 detects that the cutting edge of the bit has broken. Then the bit 9 is retracted by the MCL along the identical path 12 defined in the program which it followed in cutting to the point of breakage, point 15. However, the retraction is executed block-by-block, in reverse order. (A block, as is known in the NC machining art, produces a single cutting step, such as a straight line or an arc. A complete cut is produced by a sequence of blocks, each representing a portion of the geometric shape of the complete cut.)

After each block of retraction, the MCL tests whether the safe zone boundary has been reached or penetrated. If not, another retraction step (or block) is executed, followed by a repetition of the inquiry as to reaching or penetrating the safe zone. As soon as the safe zone is penetrated (at either the radial safe zone boundary indicated by X1 or X2 or other outer axial safe zone boundary indicated by Z2), the retraction sequence is terminated, and the MCL commands the bit to move directly to the Z-axis home position, along path 24A. Following this Z-axis homing move, and not before it, the MCL then commands a homing move to the X-axis home position, along path 21A, thereby bringing the bit 9 to the home position of origin O.

Of course, Z-axis homing cannot be done if only the inner safe zone boundary (indicated by Z1) is penetrated because the bit 9 may then strike the stock (or workpiece 3) during homing. However, the preferred embodiment is concerned with cutting operations in which it would be unlikely that the bit 9 would cross the axial inner safe zone boundary Z1 during retraction. Therefore, in practice, only three safe zone boundaries, namely, X1, X2, and Z2 would probably be tested.

After the bit 9 reaches the origin O, the bit is changed, either manually, or automatically, with changing apparatus known in the art. At the time of safe zone boundary crossing, the X and Z coordinates of the cutting bit 9 are stored by the MCL. Following tool bit change, MCL executes the X and Z homing moves in reversed order, and in reversed directions, along paths 21B and 24B, and brings the cutting but 9 to the boundary crossing point.

The MCL then moves the bit along the path 12 up to the point 15 of breakage along the same path as originally executed prior to the break. When the point 15 of breakage is reached, the MCL allows the bit to follow its programmed instructions to finish cutting the workpiece 3.

Figure 4:
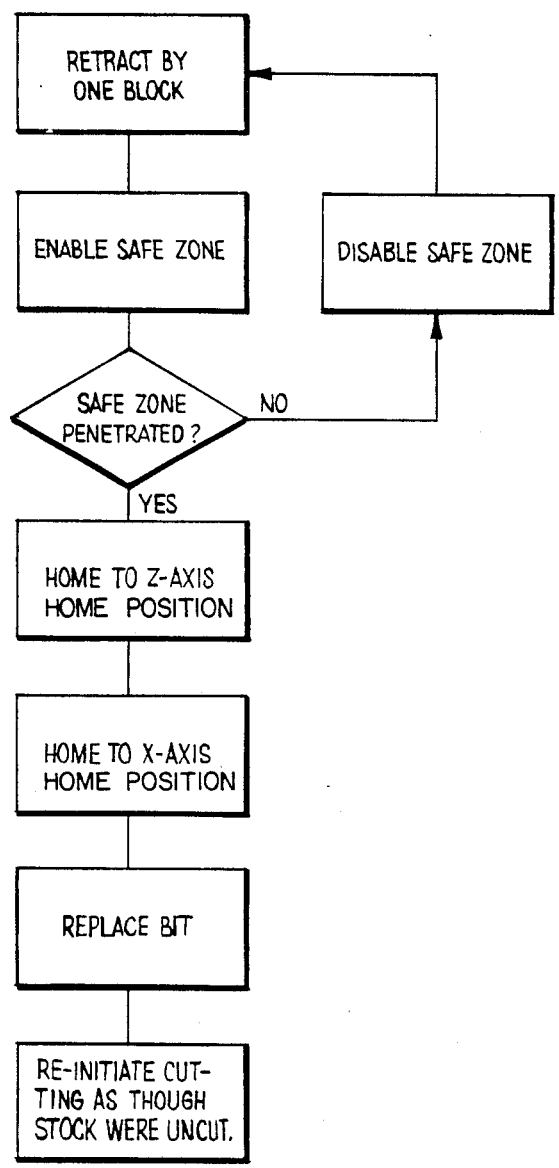
FIG. 4 is a flow chart which describes one sequence of events in the present invention.

A flow chart of one procedure which implements the present invention is given in FIG. 4 and is considered self-explanatory.

Numerous modifications and substitutions can be undertaken without departing from the true spirit and scope of the present invention.

What is desired to be secured by Letters Patent of the United States is the invention as defined in the following claims.

I claim:

1. A method of positioning a cutting bit at a tool change position in a machining apparatus which drives the cutting bit along a first path in a first direction to machine a workpiece, comprising the steps of:

retracting the cutting bit along the first path in a second direction opposite the first direction;

determining whether the cutting bit has reached a predetermined safe zone boundary as the cutting bit is being retracted; and moving the cutting bit to the tool change position along a second path different from the first path when the tool has reached the safe zone boundary.

2. The method of claim 1, further comprising the steps of:

sensing the condition of the cutting bit; and performing the retracting, determining, and moving steps in response to the sensing step.

3. The method of claim 2, in which the sensing step comprises sensing breakage of the cutting bit.

4. The method of claim 1, in which the first path comprises a plurality of movements of the cutting bit executed in a predetermined order; and the retracting step comprises causing the cutting bit to execute the plurality of movements of the first path in an order which is the reverse of the predetermined order.

5. The method of claim 4, in which the machining apparatus drives the cutting bit along one or more axes;

the tool change position is located at predetermined coordinates with respect to those axes; and the moving step comprises moving the cutting bit parallel to a selected one of those axes from the place where the cutting bit has reached the safe zone boundary to a first coordinate of the tool change position.

6. The method of claim 5, in which the moving step further comprises moving the cutting bit parallel to another one of the axes to a second coordinate of the tool change position.

7. The method of claim 1, in which the machining apparatus drives the cutting bit along one or more axes;

the tool change position is located at predetermined coordinates with respect to those axes; and the moving step comprises moving the cutting bit parallel to a selected one of those axes from the place where the cutting bit has reached the safe zone boundary to a first coordinate of the tool change position.

8. The method of claim 7, in which the moving step further comprises moving the cutting bit parallel to another one of the axes to a second coordinate of the tool change position.

9. The method of claim 1, in which the first path comprises a plurality of steps, the retracting step comprises retracting the cutting bit step-by-step along the first path, and the determining step comprises determining whether the cutting bit has reached the safe zone boundary after completing each retraction step.

10. The method of claim 1, further comprising the step of:

moving the cutting bit away from the tool change position along the second path to the safe zone boundary and then moving the cutting bit along the predetermined first path to machine the workpiece.

* * * * *